(12) United States Patent
Westberg (10) Patent No.: US 7,725,365 B2
(45) Date of Patent: May 25, 2010

(54) CUSTOM GAUGE PANEL ORDERING APPARATUS METHOD AND SYSTEM

(75) Inventor: Aaron R. Westberg, Lindon, UT (US)

(73) Assignee: Speedhut Inc., Orem, UT (US)

( * ) Notice: Subject to any disclaimer, the term of this patent is extended or adjusted under 35 U.S.C. 154(b) by 1012 days.

(21) Appl. No.: 11/435,595

(22) Filed: May 17, 2006

(65) Prior Publication Data

US 2006/0218051 A1 Sep. 28, 2006

Related U.S. Application Data

(63) Continuation of application No. 10/403,404, filed on Mar. 31, 2003, now abandoned.

(51) Int. Cl.
*G06F 17/30* (2006.01)

(52) U.S. Cl. .................. 705/27; 705/26; 707/104.1; 700/97; 345/419; 345/426

(58) Field of Classification Search ............ 705/26, 705/27; 707/104.1; 700/97; 345/419, 426
See application file for complete search history.

(56) References Cited

U.S. PATENT DOCUMENTS 6,167,383 A * 12/2000 Henson ................ 705/26
7,197,418 B2 * 3/2007 Fuller et al. ............ 702/127
7,328,171 B2 * 2/2008 Helot et al. ............ 705/26
2004/0111435 A1 * 6/2004 Herbert et al. .......... 707/104.1
2004/0143511 A1 * 7/2004 Miller et al. ............ 705/26

OTHER PUBLICATIONS

Patents and Documents Disclosed In U.S. Appl. No. 10/403,404, filed Mar. 31, 2003 by Aaron R. Westberg.

* cited by examiner

*Primary Examiner*—Yogesh C Garg
(74) *Attorney, Agent, or Firm*—Utah Valley Patent; Steve McDaniel (57) ABSTRACT

A custom gauge ordering apparatus facilitates selecting options related to a gauge panel, previewing the selected options under daylight or nighttime conditions, and submitting orders for a gauge panel with the selected options. The order may be automatically received by an order fulfillment system and used to direct or control manufacture of the custom gauge panel. In another aspect of the invention, a custom gauge panel includes a user-selected design printed on a translucent medium that is bonded to an electro-luminescent substrate. In one embodiment, the custom gauge panel also includes substantially transparent layer that stiffens and protects the translucent medium and user-selected design printed thereon during manufacture, installation, and use. The simplicity of the custom panel reduces the material and labor costs associated with producing a custom gauge panel.

23 Claims, 6 Drawing Sheets

CUSTOM GAUGE PANEL ORDERING APPARATUS METHOD AND SYSTEM

RELATED APPLICATIONS

This application is a continuation of, and claims priority to, U.S. patent application Ser. No. 10/403,404 entitled "CUSTOM GAUGE PANEL AND SYSTEM AND METHOD FOR MANUFACTURE THEREOF" and filed on 31 Mar. 2003, now abandoned, for Aaron R. Westberg, which application is incorporated herein by reference.

BACKGROUND OF THE INVENTION

1. Field of the Invention

This invention relates generally to devices, methods, and systems for displaying information. Specifically, the invention relates to custom made gauge panels and devices, methods, and systems for ordering and manufacturing custom made gauge panels.

2. Description of the Related Art

Gauge panels such as instrument panels found within vehicles are required to function in a wide variety of conditions and environments. The materials and methods used to produce gauge panels must be carefully selected to maintain color and vibrancy over many years of use.

Car and truck enthusiasts often modify their vehicles for aesthetic and functional reasons. As a result, a market for custom made gauge panels exists. Unfortunately, currently available gauge panels and associated manufacturing and ordering methods are not suited for customization. For example, current gauge panel manufacturing methods typically involve screen printing processes which are ill-suited for customization. Furthermore, materials appropriate for mass production often do not work well in custom manufacturing environments.

Operator error and tolerance drift occurs more frequently in custom manufacturing environments. Customers often do not accurately specify their expectations and technicians may misinterpret custom orders. As a result, producing custom gauge panels often requires rework resulting in reduced profits for the manufacturer and higher prices for customers.

What is needed is a custom gauge panel that is easy to order and install by the customer, and simple to produce by the manufacturer. In particular, customers need the ability to select various options for a custom gauge panel, preview a gauge panel with the selected options, and submit an order for a custom gauge panel with the selected options. Manufacturers, on the other hand, need a system and method to produce custom gauge panels in a reliable cost-effective manner. Preferably, such a gauge panel and associated ordering and manufacturing methods would require relatively few layers of material thereby reducing manufacturing cost and complexity.

SUMMARY OF THE INVENTION

The various elements of the present invention have been developed in response to the present state of the art, and in particular, in response to the problems and needs in the art that have not yet been fully solved by currently available custom gauge panels and associated ordering and manufacturing methods and systems. Accordingly, the present invention provides an improved custom gauge panel, a method and system for manufacturing custom gauge panels, and an apparatus, method, and system for ordering custom gauge panels.

In one aspect of the present invention, an apparatus (such as a gauge panel) for displaying information in a vehicle includes an electro-luminescent substrate bonded directly to a translucent medium, the translucent medium having a user-selected design printed thereon. In one embodiment, the user-selected design printed on the translucent medium includes a plurality of layers printed with user-selected colors. One or more layers of the plurality of layers may contain a user-selected graphic including a user-provided or user-designed graphic.

In one embodiment, the translucent medium is selected from a vinyl film, a polyester film, a metallized polyester film, a fluorescent vinyl film, a luminous phosphor film, and a polycarbonate film. Preferably, the translucent medium is made of materials that are non-outgassing and substantially stable over a wide range of vehicle interior conditions.

A substantially transparent protective layer may be laminated to the translucent medium to facilitate manufacture of the apparatus and protect the translucent medium and user-selected design during installation and use. In one embodiment, the substantially transparent protective layer is selected from a polyester material, a vinyl material, and a polycarbonate material. The substantially transparent protective layer may be a scratch resistant material such as a textured vinyl.

The electro-luminescent substrate provides backlighting to the dial face layers under low-light and nighttime conditions. In one embodiment, the electro-luminescent substrate is a pre-manufactured electro-luminescent panel. In another embodiment, the electro-luminescent substrate includes a layer of electro-luminescent material and one or more protective layers.

In a second aspect of the present invention, a method for manufacturing a custom gauge panel includes printing a user-selected design to a translucent medium, and bonding the translucent medium directly to an electro-luminescent substrate. The user-selected design may include a graphic that is selected, created, or provided by a customer or customer representative. In one embodiment, printing the user-selected design comprises a thermal transfer printing process.

The translucent medium is preferably made of materials that are non-outgassing and substantially stable over a wide range of vehicle interior conditions. In one embodiment, the translucent medium has an adhesive backing that facilitates bonding the translucent medium to a substrate.

The user-selected design may be printed to the translucent medium using a thermal transfer print process. In one embodiment, printing the user-selected design involves loading a control file corresponding to a vehicle make and model within a print controller and selectively activating layers from a plurality of layers within the control file. The selectively activated layers may be assigned user-selected colors. In one embodiment, the selectively activated layers correspond to layers of resin-based thermal transfer foil that are thermally transferred to the translucent medium using a thermal transfer print process.

To stiffen and protect the translucent medium during manufacture, installation, and use, a substantially transparent layer may be laminated to the translucent medium previous to bonding the translucent medium to the substrate. The substantially transparent layer may be a scratch resistant material such as a textured vinyl.

In another aspect of the invention, one embodiment of a system for manufacturing custom gauge panels includes a printing station configured to print a user-selected design to a translucent medium, a lamination press configured to laminate a substantially transparent protective layer to the translucent medium and thereby provide a dial face, a cutting station configured to cut the dial face, and a bonding station configured to bond the dial face to an electro-luminescent substrate.

The system for manufacturing custom gauge panels may also include an order fulfillment server configured to receive a user-selected design from a customer. The system for manufacturing custom gauge panels facilitates manufacturing custom gauge panels and may use the aforementioned method for manufacturing a custom gauge panel.

In another aspect of the present invention, an apparatus for ordering a custom manufactured gauge panel includes one or more option selectors configured to enable selection of gauge panel options, a preview module configured to preview a gauge panel with the selected gauge panel options, and an order submission module configured to submit an order for a gauge panel with the selected gauge panel options. In one embodiment, the apparatus for ordering a custom manufactured gauge panel also includes an order status module configured to display a status for a submitted order. In the aforementioned embodiment, the preview module is further configured to preview the gauge panel under various lighting conditions such as daylight and nighttime conditions.

In one embodiment, the option selectors include selectors that facilitate selecting background options, dial scale options, and dial face text options. The selectors for background options may include a background pattern selector, a background color selector, and a graphic selector. The selectors for dial scale options may include a tick mark style selector, a tick mark color selector, a scale font style selector, a scale font size selector, a scale font color selector, a shift line range selector, a shift line style selector, and a shift line color selector. The selectors for dial face text options may include a text position selector, a text alignment selector, a font style selector, a font color selector, and a font size selector. The various selectors facilitate selecting, previewing, and submitting an order for a custom manufactured gauge panel.

In one embodiment, the apparatus for ordering a custom manufactured gauge panel includes a graphical editor configured to enable graphical editing of a custom dial face, an upload module configured to receive a dial face design provided by a user, and a text editor configured to enable entry of a desired text string.

In another aspect of the present invention, a system for ordering a custom manufactured gauge panel includes an order station configured to preview a gauge panel with a user-selected design, and a printing station configured to print the user-selected design to a translucent medium. Furthermore, the system for ordering a custom manufactured gauge panel may also include an order fulfillment server configured to receive an order for a gauge panel with the user-selected design, a lamination press configured to laminate a substantially transparent protective layer to a translucent medium, a cutting station configured to dial face, and a bonding station configured to bond a dial face to an electro-luminescent substrate.

The various elements and aspects of the present invention facilitate ordering, manufacturing, and providing custom gauge panels to geographically dispersed customers in an efficient manner. These and other features and advantages of the present invention will become more fully apparent from the following description and appended claims, or may be learned by the practice of the invention as set forth hereinafter.

It should be noted that references to features, advantages, or similar language within this specification does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The aforementioned features and advantages of the present invention will become more fully apparent from the following description and appended claims, or may be learned by the practice of the invention as set forth hereinafter.

BRIEF DESCRIPTION OF THE DRAWINGS

To enable the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Some of the functional units described in this specification have been explicitly labeled as modules, (while others are assumed to be modules) in order to emphasize their implementation independence. For example, a module may be implemented as a hardware circuit comprising custom VLSI circuits, MEMS devices, or gate arrays, off-the-shelf semiconductors such as logic chips, transistors, or other discrete electrical or mechanical components. A module may also be implemented in programmable hardware devices or systems such as field programmable gate arrays, programmable array logic, and programmable logic devices.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
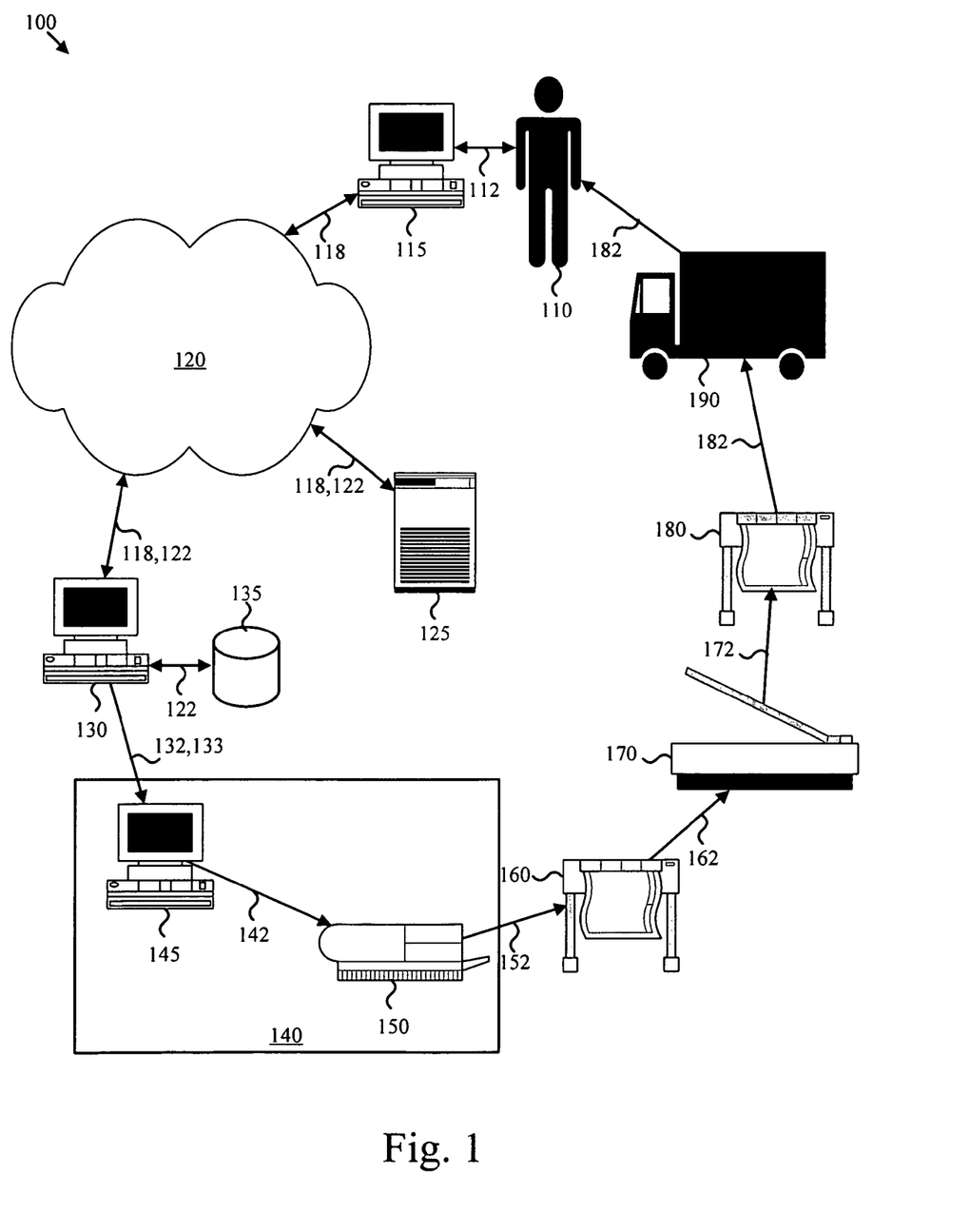
FIG. 1 is a schematic diagram illustrating one embodiment of an order fulfillment system of the present invention.

FIG. 1 is a schematic diagram illustrating one embodiment of an order fulfillment system 100 of the present invention. As depicted, the order fulfillment system 100 includes a customer (or customer representative) 110, an order station 115, a communications network 120, a order fulfillment server 130, a print station 140 including a print controller 145 and a printer 150, a lamination press 160, a cutting station 170, a bonding station 180, and a shipping service 190. The order fulfillment system may also include a web server 125 and an order database 135. The order fulfillment system 100 is specifically optimized to fulfill orders for custom gauge panels or the like.

The customer 110 or a representative of the customer 110 interacts with the order station 115 via interactions 112 such as placing, previewing, reviewing, and tracking orders for custom gauge panels or the like. In one embodiment, the order station 115 is a computer equipped with a web browser. In another embodiment, the order station 115 is a kiosk placed at an automotive store or the like. In another embodiment, the order station 115 is a telephone. The interactions 112 conducted by the user may initiate communications 118 on the communications network 120. As depicted, the communications 118 occur between the order station 115, the web server 125, and the order fulfillment server 130.

In one embodiment, the communications 118 conducted with the web server 125 includes options selected by the customer for a custom gauge panel that may be ordered by the customer. For example, a web page presented to the order station 115 by the web server 125 may include a number of option selectors used by the customer (or customer representative) to select desired options for a custom gauge panel. In response to reception of options selected by the customer, the web server 125 may provide data used to generate a preview of the custom gauge to the customer on the order station 115.

In addition to previewing a custom gauge panel, the customer may generate an order request 122 or initiate generation of an order request 122 via the web server 125. As depicted, the order request 122 is received by the order fulfillment server 130 and may be placed in the order database 135. Once received, the order request 122 may be viewed and edited by an operator, technician, customer service agent, or the like.

In another embodiment, an electronic catalog executing on the order station 115 or the like conducts communications 118 directly with the order fulfillment server 130 that facilitates placing, previewing, reviewing, and tracking orders for custom gauge panels or the like. The communications 118 may include an order request 122. In yet another embodiment, a customer service agent enters an order request 122 at a terminal as directed by a customer verbally communicating the communications 118 over a network 120 that is a telephone network.

Once received by the order fulfillment server 130, a set of order options 132 may be extracted from the order requests 122. In addition, one or more tooling control data files 133 may be provided by the order fulfillment server 130 or the like. The order options 132 and the tooling control data files 133 may be used to direct or control manufacture of a custom gauge panel. The order options 132 and the tooling control data files 133 may be used by machinery, equipment, or personnel to fulfill the order requests 122.

At the print station 140, which in the depicted embodiment includes a print controller 145 and a printer 150, a custom design is imprinted on a translucent medium. As depicted, the printer 150 prints a custom design on the translucent medium as directed by a print control stream 142 generated by the print controller 145. The material and color of the translucent medium may be selected by the customer. In one embodiment, the printer 150 is a thermal transfer printer and the translucent medium is selected from vinyl films, polyester films, metallized polyester films, fluorescent vinyl films, luminous phosphor films, polycarbonate films, or the like.

In one embodiment, a selected translucent medium is loaded on the printer 150, a control file is loaded on the print controller 145 corresponding to a particular vehicle model, and layers are activated within the control file corresponding to options selected by the customer. For example, the control file may corresponding to a particular vehicle model may contain a layer for each dial scale font style that may be selected by the customer. Furthermore, a color selected by the customer may be assigned to each activated layer within the control file. In one embodiment, the control file is an Adobe Illustrator™ file and a resin-based thermal transfer foil corresponding to the assigned color is loaded into the printer 150 for each layer that is printed.

In one embodiment, the aforementioned processes associated with the print station 140 are conducted by personnel. In another embodiment, the processes are monitored by personnel and conducted automatically in response to reception of the order options 132 or the tooling control data files 133 by the print station 140.

At the lamination station 160, the translucent medium is laminated with a substantially transparent layer that protects the translucent medium and the custom design printed thereon. In one embodiment, the lamination station 160 includes a heat lamination press and the substantially transparent layer is made of a suitable film such as a polyester, vinyl, or polycarbonate film. In addition to protection, the substantially transparent layer may also function to stiffen the translucent medium in that the medium may be a very supple film. Stiffening the translucent medium increases manufacturing precision and reduces manufacturing errors.

The combination of the translucent medium and custom printed design laminated with the substantially transparent layer essentially forms an uncut dial face 162. In selected embodiments, a cutting mask is also laminated to the exposed surface of the substantially transparent layer at the lamination station 160 in order to protect the dial face 162 during cutting operations. In one embodiment, the cutting mask is a layer of thin paper.

At the cutting station 170, the dial face 162 is cut to the proper dimensions to create a cut dial face 172. In one embodiment, the cutting station 170 is a laser cutter. At the bonding station 180, the cut dial face 172 is bonded to an electro-luminescent substrate to form a custom gauge panel 182. In one embodiment, the electro-luminescent substrate is a pre-manufactured electro-luminescent panel that receives an AC driving signal and emits electro-luminescent light. In another embodiment, the electro-luminescent substrate comprises an electro-luminescent layer and a protective layer that are laminated to the cut dial face 172.

As depicted, the custom gauge panel 182 is packed and shipped via a shipping service 190 in order to fulfill the order request 122 generated by the customer 110. The order fulfillment system 100 enables reception and fulfillment of orders for custom gauge panels in an efficient effective manner. The graphical design of the custom gauge panel 182, and in certain embodiments, the materials used to manufacture the custom gauge panel 182 correspond to options selected by the customer when previewing the selected options and generating the order request 122.

Figure 2:
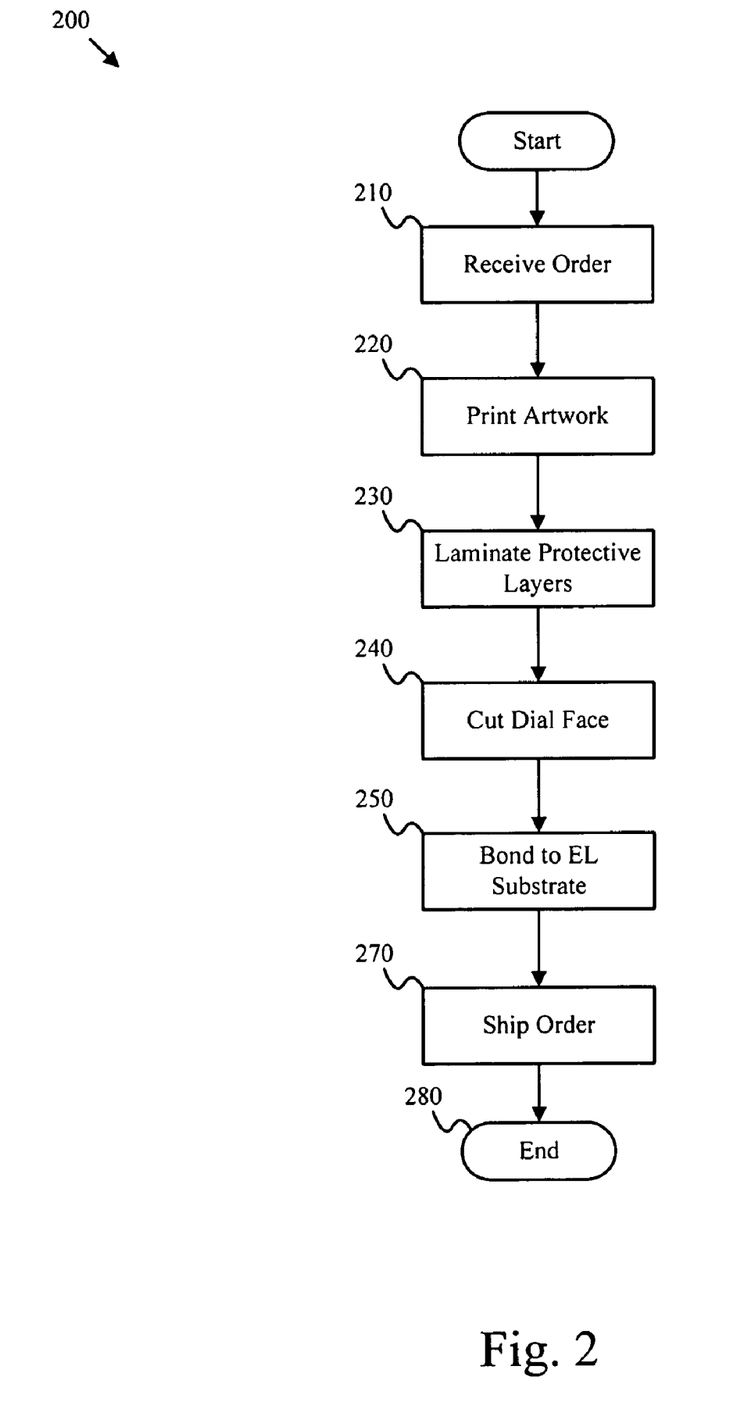
FIG. 2 is a flow chart illustrating one embodiment of an order fulfillment method of the present invention.

FIG. 2 is a flow chart illustrating one embodiment of an order fulfillment method 200 of the present invention. The order fulfillment method 200 may be conducted in conjunction with, or independent of, the order fulfillment system 100. As depicted, the order fulfillment method 200 includes a receive order step 210, a print artwork step 220, a laminate step 230, a cut artwork step 240, a bond step 250, and a ship order step 260. The order fulfillment method 200 facilitates manufacturing custom gauge panels or the like.

At the receive order step 210, an order such as the order request 122 is received from a customer, customer agent or the like. The order may specify particular options and designs desired by the customer. At the print artwork step 220, artwork appropriate to the order request is printed on a suitable medium such as a translucent material. At the laminate step 230 one or more protective layers are laminated to the suitable medium containing the printed artwork to provide an uncut dial face such as the uncut dial face 162.

At the cut dial face step 240, the uncut dial face is cut to appropriate dimensions and subsequently bonded to a suitable substrate at the bond step 250. In one embodiment, the suitable substrate is an electro-luminescent panel. Bonding the cut dial face to the suitable substrate essentially forms a custom gauge panel that is packed and shipped to the customer or customer agent at the ship order step 260. Upon completion of the ship order step 260 the depicted order fulfillment methods ends 270.

Figure 3:
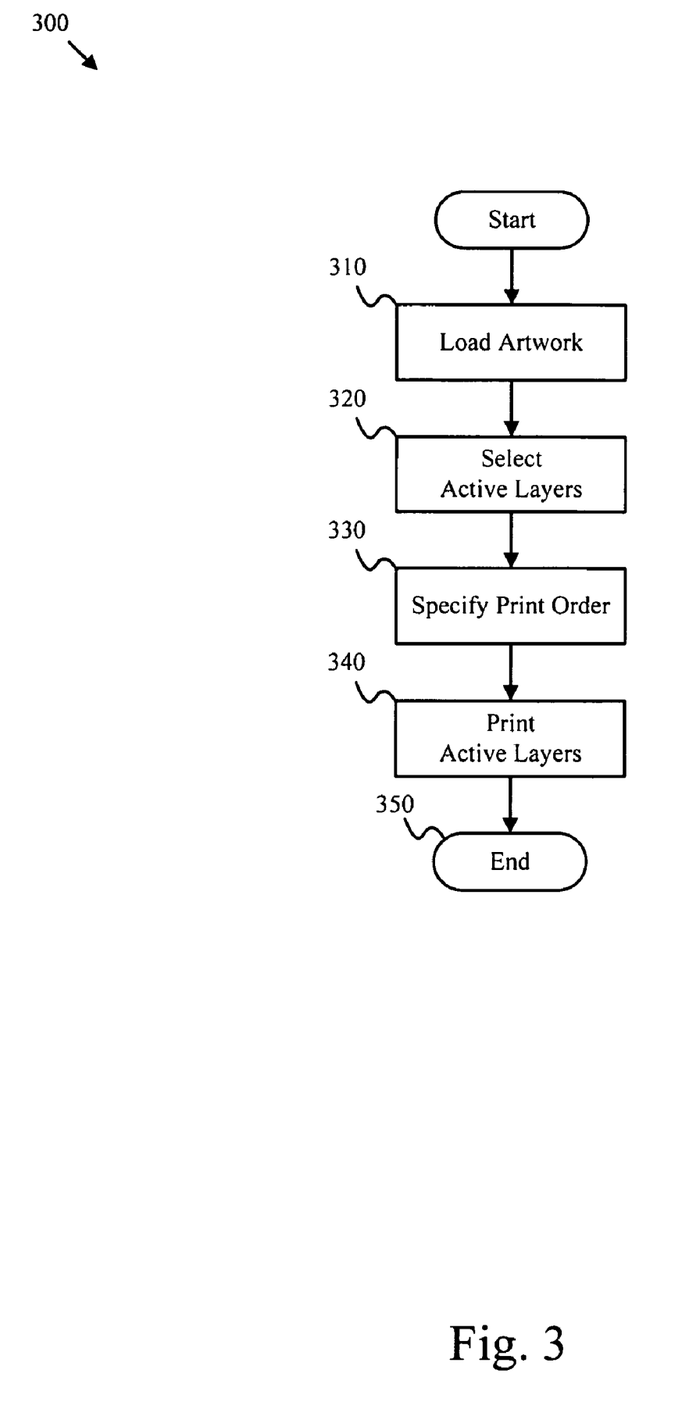
FIG. 3 is a flow chart illustrating one embodiment of a custom panel print method of the present invention.

FIG. 3 is a flow chart illustrating one embodiment of a custom panel print method 300 of the present invention. The custom panel print method 300 may be conducted in conjunction with, or independent of, the print station 140. The custom panel print method 300 includes a load artwork step 310, a select active layers step 320, a specify print order step 330, and a print active layers step 340.

At the load artwork step 310, artwork is loaded into a print controller or the like that supports multiple layers of artwork. In certain embodiments, the artwork is stored in one or more graphics files containing layers corresponding to various options provided to a customer. At the select active layers step 320, selected layers are activated for printing. The selected layers may correspond to particular options selected by the customer. In one embodiment, the selected layers are assigned colors specified by the customer.

Subsequent to the select active layers step 320, the custom panel print method 300 proceeds to the specify print order step 320. At the specify print order step 320, a printing order is specified for the active layers. In certain embodiments, the layers may be pre-arranged within the artwork files and the specify print order step 320 need not be conducted. At the print active layers step 340, the selected layers are printed in the specified order. In one embodiment, the layers are printed to a translucent medium by a thermal transfer printer and each layer corresponds to a resin-based foil that is loaded into the printer previous to printing that layer of artwork.

Figure 4:
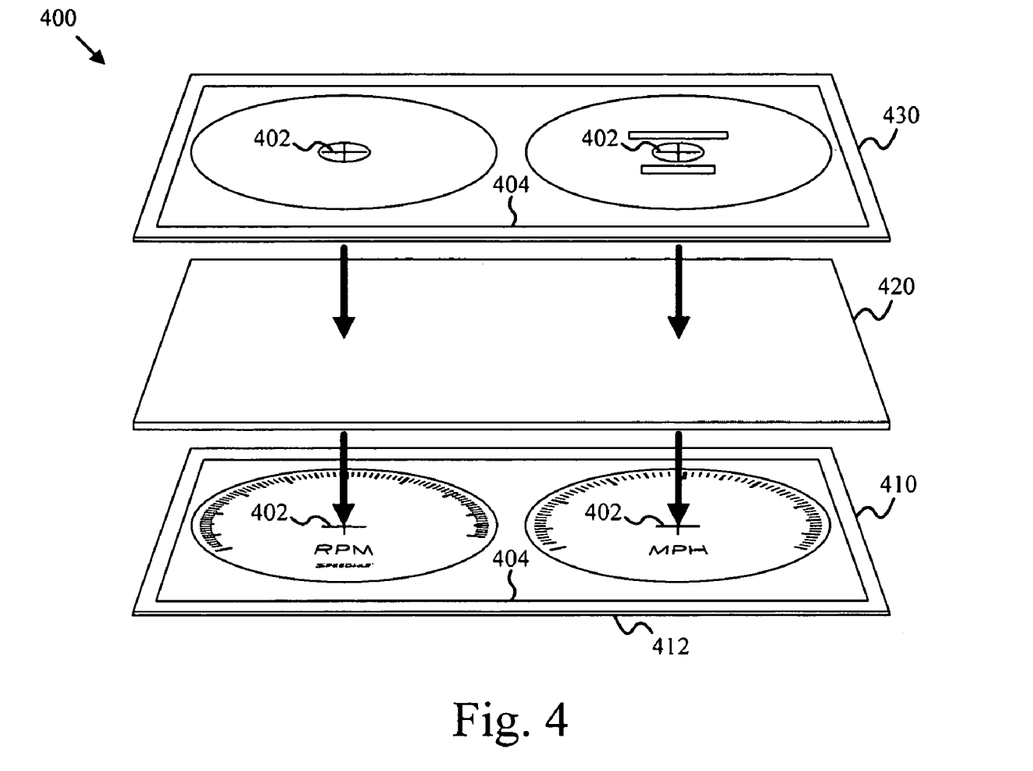
FIG. 4 is a perspective drawing of one example of an uncut dial face of the present invention.

FIG. 4 is a perspective drawing of one example of an uncut dial face 400 of the present invention. As depicted, the uncut dial face 400 includes an artwork layer 410, a protective layer 420, and a cutting mask 430. The artwork layer 410 and the cutting mask 430 may also include one or more alignments marks 402 as well as an alignment outline 404. For illustration purposes the thickness of each layer is exaggerated.

As depicted, the artwork layer 410 is a translucent medium with custom artwork printed thereon. The artwork layer 410 is laminated with a protective layer 420. The depicted artwork layer 410 is shown with an adhesive backing 412 that facilitates bonding to a substrate. The depicted embodiment also shows a cutting mask 430 with various markings to facilitate alignment and cutting of the uncut dial face 400. The uncut dial face 400 facilitates manufacture of a custom gauge panel or the like.

Figure 5:
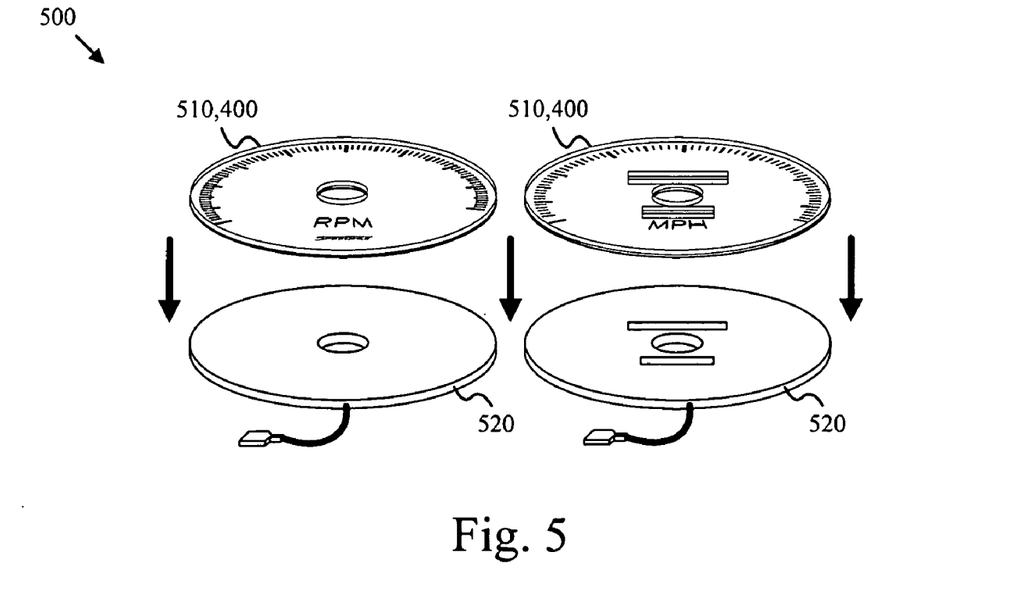
FIG. 5 is a perspective drawing of one example of a custom panel of the present invention.

FIG. 5 is a perspective drawing of one example of a custom panel 500 of the present invention. The custom panel 500 is one example of a custom gauge panel created with the order fulfillment system 100 and the order fulfillment method 200. The custom panel 500 includes a gauge face 510 and a substrate 520. In the depicted embodiment, the substrate 520 is an electro-luminescent panel and the gauge face 510 is cut from the lamination layers 400 shown in FIG. 4. In another embodiment, the substrate 520 comprises an electro-luminescent layer and one or more protective layers. The gauge face 510 may be bonded directly to the substrate 520 to provide the custom panel 500.

Figure 6:
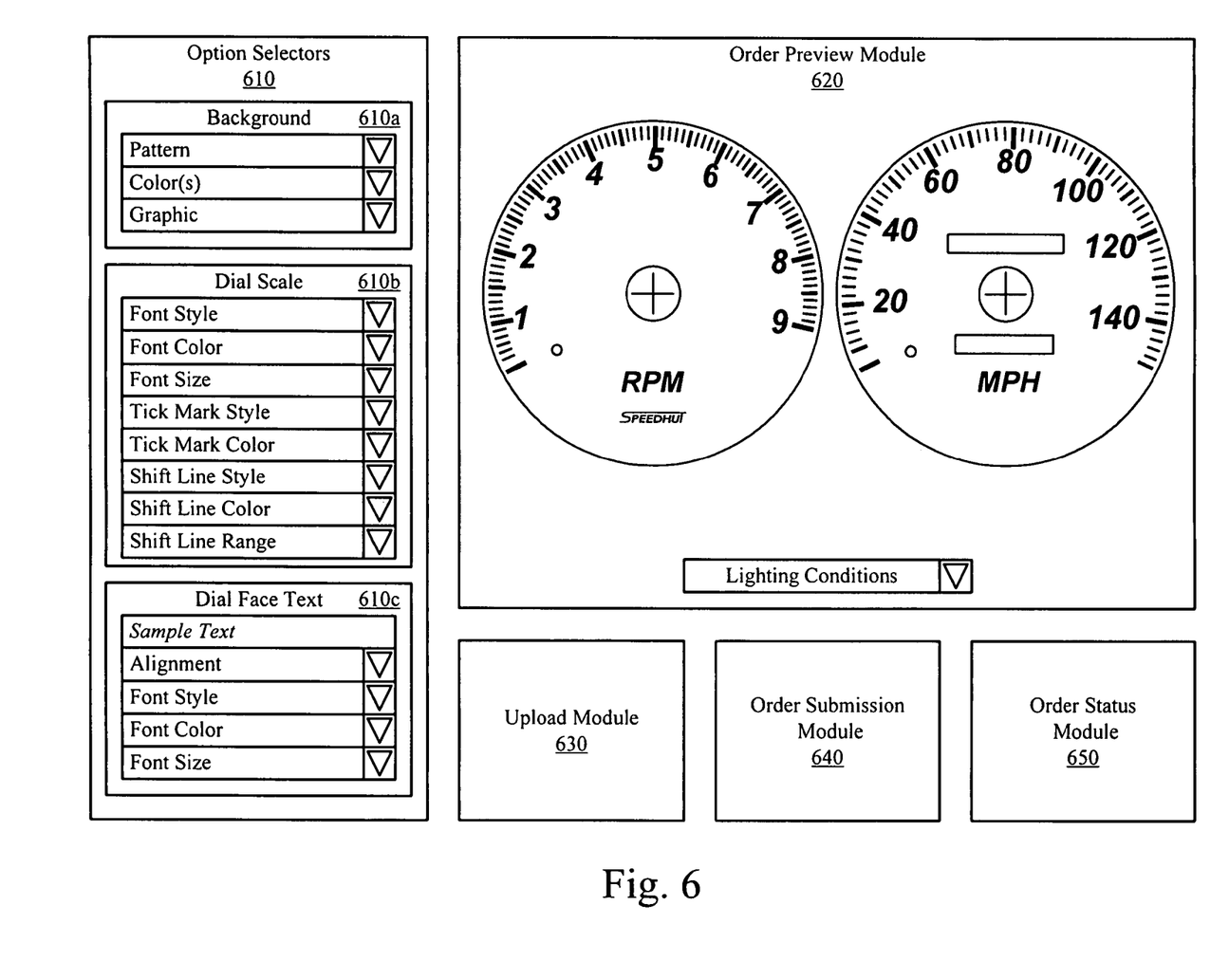
FIG. 6 is a block diagram illustrating one embodiment of a gauge panel ordering apparatus of the present invention.

FIG. 6 is a block diagram illustrating one embodiment of a gauge panel ordering apparatus 600 of the present invention. The gauge panel ordering apparatus 600 is one example of the order station 115 shown in FIG. 1 and may be used to generate order requests for a custom panel such as the custom panel 500 or the custom gauge panel 182. As depicted, the custom panel ordering apparatus includes one or more option selectors 610, an order preview module 620, an upload module 630, an order submission module 640, and an order status module 650. The depicted modules and selectors facilitate selecting, previewing, and ordering a custom panel such as a gauge panel.

The depicted option selectors 610 include background selectors 610a, dial scale selectors 610b, and dial face text selectors 610c. The depicted background selectors 610a include pattern, color, and graphic selectors. In one embodiment, the background pattern selectors include options for a checkered flag pattern, a diamond pattern, a flame pattern, and a racing stripe pattern. In one embodiment, the background color selector includes options for colors such as white, metallic silver, hot pink, midnight blue, lime, cool blue, yellow tangerine, and intense red. The graphic selector may include options for a variety of graphical symbols, logos, or designs particularly symbols, logos, or designs popular among car and truck enthusiasts. In one embodiment, the graphic selector includes options for a customer uploaded design and a customer created design.

The depicted dial scale selectors 610b include font style, color, and size selectors, tick mark style and color selectors, and shift line style, color, and range selectors. In one embodiment, the dial scale font style selector includes options for swiss, beetle, eurostyle, and rickshaw font styles. The depicted dial face text selectors include a text editor, a text alignment selector, and selectors for the font style, font color, and font size of the dial face text. The depicted option selectors 610 are intended to be exemplary and are not to be considered an exhaustive enumeration of options relevant to ordering a custom gauge panel or the like.

The order preview module 620 previews a gauge panel having the options specified with the option selectors 610. In one embodiment, the order preview module includes a lighting conditions selector that facilitates previewing an order for a custom made gauge panel under various lighting conditions such as daytime, twilight, dawn, dusk, streetlight, and nighttime conditions.

The upload module 630 facilitates uploading a custom graphic, previewing a gauge panel with the custom graphic, and submitting an order for a gauge panel or the like with the uploaded custom graphic.

The order submission module 640 submits an order for a custom made gauge panel, or the like, having the options specified by the options selectors 610 and previewed by the order preview module 620. In one embodiment, the order is submitted to the order fulfillment server 130 depicted in FIG. 1.

The order status module 650 receives and displays status information concerning the status of an order for a custom made gauge panel or the like. In one embodiment, the order status module 650 communicates with the order fulfillment server 130 depicted in FIG. 1 and indicates confirmation of an order, work completed on an order, and tracking information related to a shipment containing a fulfilled order.

Figure 7:
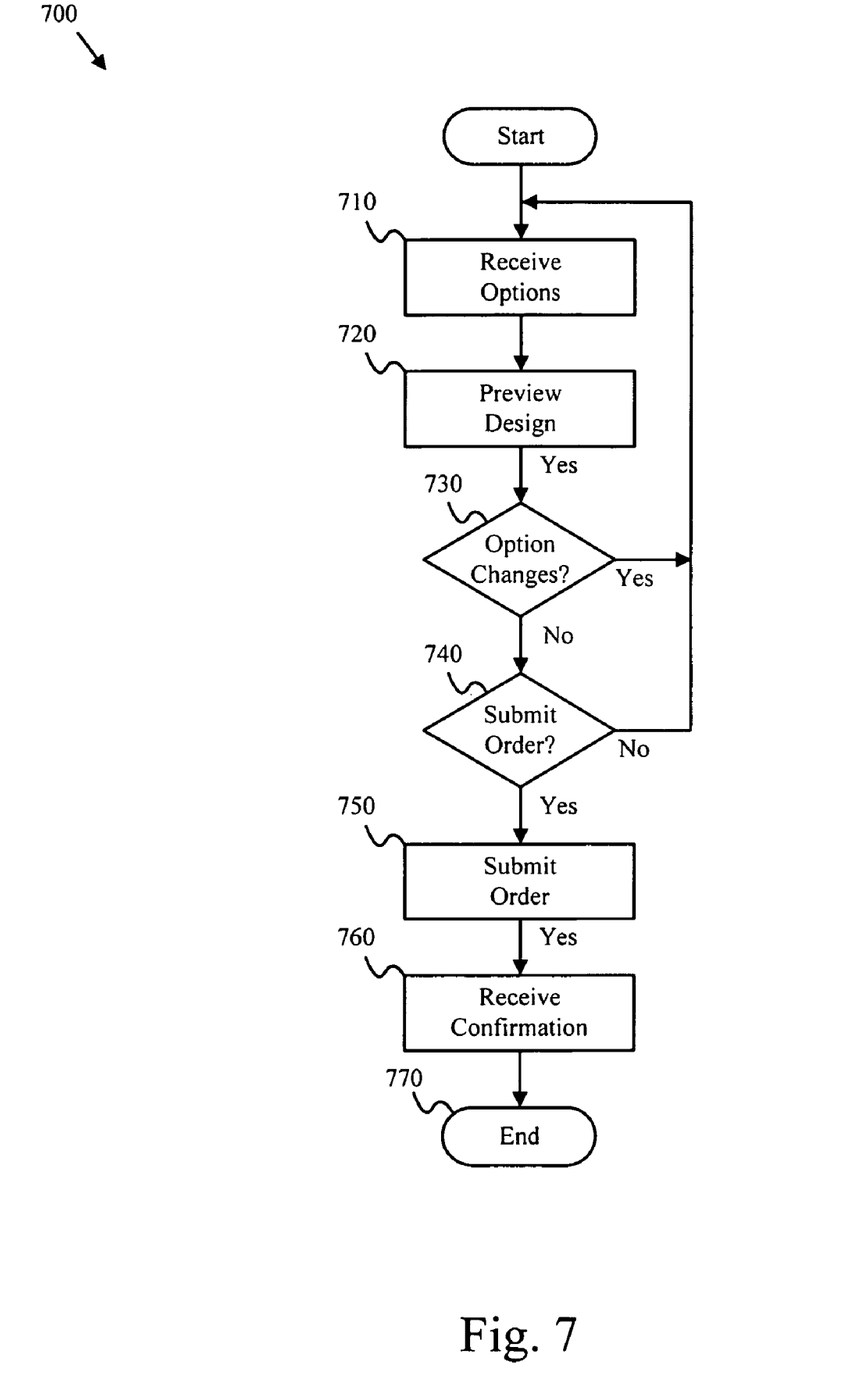
FIG. 7 is a flow chart illustrating one embodiment of a gauge panel ordering method of the present invention.

FIG. 7 is a flow chart illustrating one embodiment of an ordering method 700 of the present invention. The ordering method 700 may be conducted in conjunction with, or independent of, the gauge panel ordering apparatus 700. As depicted, the ordering method 700 includes a receive options step 710, a preview step 720, an options finalized test 730, a submit order test 740, a submit order step 750, and a receive order confirmation step 760. The ordering method 700 facilitates previewing, submitting and confirming an order for a custom product such as a gauge panel.

The receive options step 710 receives one or more options selected by a customer or customer representative. In one embodiment, the options are specified with option selectors, such as the option selectors 610 shown in FIG. 6. The preview step 720 previews a custom made product such as a gauge panel with the selected options. In one embodiment, previewing comprises rendering a depiction of the custom made product on a display device. Previewing a custom made product with the selected options facilitates review and decision making by a customer. In particular, previewing a custom made product such as a gauge panel with the selected options facilitates assessment of the aesthetic characteristics of the custom made product and increases the comfort level of the customer.

The options finalized test 730 ascertains whether additional changes to the custom made product are desired by the customer. If additional changes are desired, the method loops to the receive options step 710. If no additional changes are desired, the method proceeds to the submit order test 740. The submit order test 740 ascertains whether the customer desires to submit an order for the previewed product. If the customer does not desire to submit an order, the method loops to the receive options step 710. If the customer requests submission of an order for the previewed custom made product, the ordering method 700 proceeds to submit order step 750.

The submit order step 750 submits an order for the previewed custom made product. In one embodiment, the order is submitted by the web server 125 on behalf of the customer 110 to the order fulfillment server 130 as depicted in FIG. 1. Subsequent to the submit order step 750, the receive confirmation step 760 waits for confirmation and displays that confirmation to the customer or customer representative. In one embodiment, a confirmation is sent by the order fulfillment server 130. Subsequent to displaying confirmation of the submitted order, the order method 700 ends 770.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for ordering a custom manufactured gauge panel, the apparatus comprising:
    a non-transitory computer-readable storage medium for storing a plurality of executable modules; and
    a processor coupled to the storage medium for executing the plurality of executable modules, the plurality of executable modules comprising:
    a plurality of option selectors including an option selector selected from a group consisting of a background pattern selector and a graphic selector, the plurality of option selectors configured to enable a user to select a plurality of selected gauge panel options,
    a lighting selector configured to enable a user to select a selected lighting condition from a plurality of viewable lighting conditions, and
    a preview module configured to receive the selected gauge panel options and the selected lighting condition and preview on a user viewable display a gauge panel with the selected gauge panel options from the group consisting of a background pattern selection and a graphic selector under the selected lighting condition.

2. The apparatus of claim 1, wherein the selected lighting condition is selected from the group consisting of daytime, twilight, dawn, dusk, streetlight, and nighttime conditions.

3. The apparatus of claim 1, wherein the group consisting of a background pattern selector and a graphic selector also includes a background color selector.

4. The apparatus of claim 1, wherein the option selector is selected from the group consisting of a text position selector, a text alignment selector, a font style selector, a font color selector, and a font size selector.

5. The apparatus of claim 1, wherein the option selector is selected from the group consisting of a tick mark style selector, a tick mark color selector, a scale font style selector, a scale font size selector, a scale font color selector, a shift line range selector, a shift line style selector, and a shift line color selector.

6. The apparatus of claim 1, further comprising a graphical editor integrated with the preview module, the graphical editor configured to enable graphical editing of a custom dial face.

7. The apparatus of claim 1, further comprising an upload module configured to receive a dial face design provided by a user.

8. The apparatus of claim 1, further comprising a text editor configured to enable entry of a desired text string.

9. The apparatus of claim 1, further comprising a text position selector configured to enable selection of a desired text position.

10. The apparatus of claim 1, further comprising a dial scale selector configured to enable selection of a desired dial scale.

11. The apparatus of claim 1, further comprising an order status module configured to display a status for a submitted order.

12. An apparatus for ordering a custom manufactured gauge panel, the apparatus comprising:
- a non-transitory storage medium for storing a plurality of executable modules; and
- a processor coupled to the storage medium for executing the plurality of executable modules, the plurality of executable modules comprising:
- a plurality of option selectors including an option selector selected from a group consisting of a background pattern selector and a graphic selector, the plurality of option selectors configured to enable a user to select a plurality of selected gauge panel options,
- a lighting selector configured to enable a user to select a night-time lighting condition from a plurality of viewable lighting conditions, and
- a preview module configured to receive the selected gauge panel options and the selected lighting condition and preview on a user viewable display a gauge panel with the selected gauge panel options from the group consisting of a background pattern selection and a graphic selector under the night-time lighting condition.

13. A method for enabling a user to order, via a software program or web page stored on a non-transitory storage medium and executed on a digital processing apparatus, a custom manufactured gauge panel, the method comprising:
- displaying a plurality of gauge panel options selectors including an option selector selected from a group consisting of a background pattern selector and a graphic selector to a user operating a computing device comprising a viewable display;
- displaying a lighting conditions selector to the user;
- receiving a plurality of selected gauge panel options and a selected lighting condition from the user; and
- previewing a gauge panel with the selected gauge panel options from the group consisting of a background pattern selection and a graphic selector under the selected lighting condition on the viewable display.

14. The method of claim 13 wherein the selected fighting condition is selected from the group consisting of daytime, twilight, dawn, dusk, streetlight, and nighttime conditions.

15. The method of claim 13, wherein the group consisting of a background pattern selector, and a graphic selector also includes a background color selector.

16. The method of claim 13, wherein the selected gauge panel option is selected from the group consisting of a text position option, a text alignment option, a font style option, a font color option, and a font size option.

17. The method of claim 13, wherein the selected gauge panel option is selected from the group consisting of a tick mark style option, a tick mark color option, a scale font style option, a scale font size option, a scale font color option, a shift line range option, a shift line style option, and a shift line color option.

18. The method of claim 13, further comprising displaying an option to graphically edit a custom dial face.

19. The method of claim 13, further comprising displaying an option to receive a dial face design from a user.

20. The method of claim 13, further comprising displaying an option to receive a custom text string.

21. The method of claim 13, further comprising displaying an option to select a desired text position.

22. The method of claim 13, further comprising displaying an option to select a desired dial scale.

23. The method of claim 13, further comprising displaying a status for a submitted order.

* * * * *